United States Patent
Viswanathan

(10) Patent No.: US 10,922,558 B2
(45) Date of Patent: Feb. 16, 2021

(54) METHOD AND APPARATUS FOR LOCALIZATION USING SEARCH SPACE PRUNING

(71) Applicant: HERE Global B.V., Eindhoven (NL)

(72) Inventor: Anirudh Viswanathan, Berkeley, CA (US)

(73) Assignee: HERE GLOBAL B.V., Eindhoven (NL)

( * ) Notice: Subject to any disclaimer, the term of this patent is extended or adjusted under 35 U.S.C. 154(b) by 83 days.

(21) Appl. No.: 16/227,532

(22) Filed: Dec. 20, 2018

(65) Prior Publication Data

US 2020/0202143 A1    Jun. 25, 2020

(51) Int. Cl.
*G06K 9/00* (2006.01)
*G05D 1/02* (2020.01)
*G06F 16/587* (2019.01)

(52) U.S. Cl.
CPC ....... *G06K 9/00798* (2013.01); *G05D 1/0246* (2013.01); *G06F 16/587* (2019.01); *G06K 9/00818* (2013.01)

(58) Field of Classification Search
CPC ............ G06K 9/00798; G06K 9/00818; G06F 16/587; G05D 1/0246
See application file for complete search history.

(56) References Cited

U.S. PATENT DOCUMENTS

| | | |
|---|---|---|
| 9,488,483 B2 | 11/2016 | Ranganathan et al. |
| 10,203,210 B1* | 2/2019 | Tagawa ................... G01C 21/32 |
| 10,724,865 B1* | 7/2020 | Ferguson ................ G01S 7/484 |
| 2017/0316333 A1* | 11/2017 | Levinson ............ G06K 9/00805 |

(Continued)

FOREIGN PATENT DOCUMENTS

WO    WO 2018/104563 A2    6/2018

OTHER PUBLICATIONS

Paudel, D. P. et al., *Optimal Transformation Estimation With Semantic Cues* [online] [retrieved Feb 7, 2019]. Retrieved via the Internet: <URL: http://openaccess.thecvf.com/content_ICCV_2017/papers/Paudel_Optimal_Transformation_Estimation_ICCV_2017_paper.pdf>. (dated 2017) 4658-4667.

(Continued)

*Primary Examiner* — Khai M Nguyen
(74) *Attorney, Agent, or Firm* — Alston & Bird LLP

(57) ABSTRACT

Methods described herein relate to reducing the computational intensity of vision-based localization. Methods may include: receiving sensor data from a vehicle traveling along a road; identifying one or more features of the environment from the sensor data; classifying the one or more identified features into one or more of a plurality of semantic classifications for the features; identifying map image data based on an identified location of the vehicle; identifying one or more features in the map image data; comparing one or more identified features of a first semantic classification with one or more features of the map image data of the first semantic classification; and registering a localized location of the vehicle within the environment based, at least in part, on the one or more identified features of the first semantic classification corresponding to the one or more features of the map image data of the first semantic classification.

20 Claims, 6 Drawing Sheets

(56) References Cited

U.S. PATENT DOCUMENTS

2018/0129887 A1\* 5/2018 Kang ................. G06K 9/00798
2018/0188027 A1\* 7/2018 Zhang ................. G06K 9/6212

OTHER PUBLICATIONS

Thapa, A. et al., *Semantic Feature Based Registration of Terrestrial Point Clouds* [online] [retrieved Feb. 7, 2019]. Retrieved via the Internet: <URL: https://www.isprs.org/proceedings/XXXVIII/3-W8/papers/p87.pdf<. (dated 2009) 6 pages.
Xiao, Z. et al., *Monocular Vehicle Self-Localization Method Based on Compact Semantic Map* [online] [retrieved Feb. 7, 2019]. Retrieved via the Internet: <URL: https://arxiv.org/ftp/arxiv/papers/1805/1805.06155.pdf>. (dated Nov. 2018) 8 pages.

\* cited by examiner

METHOD AND APPARATUS FOR LOCALIZATION USING SEARCH SPACE PRUNING

TECHNOLOGICAL FIELD

Example embodiments of the present invention relate generally to localization of an apparatus within a mapped region, and more particularly, to improving the efficiency of localization through a reduction in the search space explored to establish an accurate location more effectively.

BACKGROUND

Road geometry modelling is very useful for map creation and identification of objects of interest in environments, such as road signs along a road segment. Such object identification may facilitate autonomous vehicle navigation along a prescribed path and/or visual localization of a vehicle traveling along a road segment based on scene or environment identification. Traditional methods for modelling of road geometry and environment or feature detection are resource intensive, often requiring significant amounts of human measurement and calculation. Such methods are thus time consuming and costly. Exacerbating this issue is the fact that many modern day applications require the analysis of large amounts of data, and therefore are not practical without quicker or less costly techniques.

Vision based mapping relies upon the identification of a location based on recognition of the environment, such as through identification of detected features in a modelled road geometry. Vision based mapping includes a map or model represented as a collection of geo-referenced images that are amenable to visual place recognition. In the case of environments that do not have satellite-based navigation availability, or where accuracy from satellite-based navigation methods may be low, a localization technique is needed to position an object, such as a vehicle, within the environment. However, such localization can be inefficient. Latency in localization is problematic for autonomous vehicle control which may require accurate localization in a timely fashion to capitalize on information stored in high definition (HD) maps for use in assisting autonomous and semi-autonomous vehicle control.

BRIEF SUMMARY

Accordingly, a method, apparatus, and computer program product are provided for localization of an apparatus within a mapped region, and more particularly, to improving the efficiency of localization through a reduction in the search space explored to establish an accurate location more effectively. Embodiments described herein may provide an apparatus including at least one processor and at least one non-transitory memory including computer program code instructions. The computer program code instructions configured to, when executed, cause the apparatus to at least: receive sensor data from a vehicle traveling along a road segment, where the sensor data includes image data from an environment of the vehicle; identify one or more features of the environment from the sensor data; classify the one or more identified features into one or more of a plurality of semantic classifications for the features; identify map image data based on a location of the vehicle; identify one or more features in the map image data; compare one or more identified features of a first semantic classification with one or more features of the map image data of the first semantic classification; and registering a localized location of the vehicle within the environment based, at least in part, on the one or more identified features of the first semantic classification corresponding to the at least one or more features of the map image data of the first semantic classification, where the localized location of the vehicle is more accurate than the identified location of the vehicle.

The plurality of semantic classifications may include one or more of lane line type, lane line color, road sign type, or road sign color. Causing the apparatus to identify map image data based on a location of the vehicle may include causing the apparatus to identify a plurality of images of an environment proximate a general location of the vehicle. Causing the apparatus to identify one or more features in the map image data may include causing the apparatus to identify one or more features in the plurality of images of the environment proximate the general location of the vehicle. Causing the apparatus to compare one or more identified features of a first semantic classification with one or more features of the map image data of the first semantic classification may include causing the apparatus to compare one or more identified features of the first semantic classification with one or more features of the first semantic classification in the plurality of images.

According to some embodiments, registering a localized location of the vehicle within the environment based, at least in part, on the one or more identified features of the first semantic classification corresponding to the one or more features of the map image data of the first semantic classification may include: identifying an image of the plurality of images in which the one or more identified features of the first semantic classification correspond with one or more features of the first semantic classification of the identified image; retrieving a location associated with the identified image; and identifying the location associated with the identified image as the localized location. In an instance in which multiple images include features of the first semantic classification corresponding to the identified features of the first semantic classification, embodiments may calculate a score between the identified features of the first semantic classification and each of the images with corresponding features of the first semantic classification, and selecting the image with the highest score.

In response to registering a localized location of the vehicle within the environment, an example apparatus may identify at least one restriction associated with the road segment of the localized location, and provide for at least partial autonomous control of the vehicle according to the at least one restriction. In response to registering a localized location of the vehicle within the environment, an example apparatus may identify at least one restriction associated with the road segment of the localized location, and provide and provide an indication to a driver of the vehicle of the at least one restriction.

Embodiments provided herein may include a computer program product having at least one non-transitory computer-readable storage medium having computer-executable program code instructions stored therein. The computer-executable program code instructions may include program code instructions to: receive sensor data from a vehicle traveling along a road segment, where the sensor data includes image data from an environment of the vehicle; identify one or more features of the environment from the sensor data; classify the one or more identified features into one or more of a plurality of semantic classifications for the features; identify map image data based on an identified location of the vehicle; identify one or more features in the map image data; compare one or more identified features of a first semantic classification with one or more features of the map image data of the first semantic classification; and register a localized location of the vehicle within the environment based, at least in part, on the one or more identified features of the first semantic classification corresponding to the one or more features of the map image data of the first semantic classification, where the localized location of the vehicle is more accurate than the identified location of the vehicle.

The plurality of semantic classifications may include one or more of lane line type, lane line color, road sign type, or road sign color. The program code instructions to identify map image data based on an identified location of the vehicle may include program code instructions to identify a plurality of images of an environment proximate a general location of the vehicle. The program code instructions to identify one or more features in the map image data may include program code instructions to identify one or more features in the plurality of images of the environment proximate the general location of the vehicle. The program code instructions to compare one or more identified features of a first semantic classification with one or more features of the map image data of the first semantic classification may include program code instructions to compare one or more identified features of the first semantic classification with one or more features of the first semantic classification of the plurality of images.

According to some embodiments, the program code instructions to register a localized location of the vehicle within the environment based, at least in part, on the one or more identified features of the first semantic classification corresponding to the one or more features of the map image data of the first semantic classification may include program code instructions to: identify an image of the plurality of images in which the one or more identified features of the first semantic classification correspond with one or more features of the first semantic classification of the identified image; retrieve a location associated with the identified image; and identify the location associated with the identified image as the localized location. In response to registering a localized location of the vehicle within the environment, the computer program product may include program code instructions to: identify at least one restriction associated with the road segment of the localized location; and provide for at least partial control of the vehicle according to the at least one restriction. In response to registering a localized location of the vehicle within the environment, the computer program product may include program code instructions to: identify at least one restriction associated with the road segment of the localized location; and provide an indication to a driver of the vehicle of the at least one restriction.

Embodiments provided herein may include a method including: receiving sensor data from a vehicle traveling along a road segment, where the sensor data includes image data from an environment of the vehicle; identifying one or more features of the environment from the sensor data; classifying the one or more identified features into one or more of a plurality of semantic classifications for the features; identifying map image data based on an identified location of the vehicle; identifying one or more features in the map image data; comparing one or more identified features of a first semantic classification with one or more features of the map image data of the first semantic classification; and registering a localized location of the vehicle within the environment based, at least in part, on the one or more identified features of the first semantic classification corresponding to the one or more features of the map image data of the first semantic classification, where the localized location of the vehicle is more accurate than the identified location of the vehicle.

The plurality of semantic classifications may include one or more of lane line type, lane line color, road sign type, or road sign color. Identifying map image data based on an identified location of the vehicle may include identifying a plurality of images of an environment proximate a general location of the vehicle. Identifying one or more features in the map image data may include identifying one or more features in the plurality of images of the environment proximate the general location of the vehicle. Comparing one or more identified features of a first semantic classification with one or more features of the map image data of the first semantic classification may include comparing one or more identified features of the first semantic classification with one or more features of the first semantic classification in the plurality of images.

According to some embodiments, registering a localized location of the vehicle within the environment based, at least in part, on the one or more identified features of the first semantic classification corresponding to the one or more features of the map image data of the first semantic classification may include: identifying an image of the plurality of images in which the one or more identified features of the first semantic classification correspond with one or more features of the first semantic classification of the identified image; retrieving a location associated with the identified image; and identifying the location associated with the identified image as the localized location. In response to registering a localized location of the vehicle within the environment, methods may include: identifying at least one restriction associated with the road segment of the localized location; and providing for at least partial autonomous control of the vehicle according to the at least one restriction.

Embodiments described herein may provide an apparatus including: means for receiving sensor data from a vehicle traveling along a road segment, where the sensor data includes image data from an environment of the vehicle; means for identifying one or more features of the environment from the sensor data; means for classifying the one or more identified features into one or more of a plurality of semantic classifications for the features; means for identifying map image data based on an identified location of the vehicle; identifying one or more features in the map image data; means for comparing one or more identified features of a first semantic classification with one or more features of the map image data of the first semantic classification; and means for registering a localized location of the vehicle within the environment based, at least in part, on the one or more identified features of the first semantic classification corresponding to the one or more features of the map image data of the first semantic classification, where the localized location of the vehicle is more accurate than the identified location of the vehicle.

The plurality of semantic classifications may include one or more of lane line type, lane line color, road sign type, or road sign color. The means for identifying map image data based on an identified location of the vehicle may include means for identifying a plurality of images of an environment proximate a general location of the vehicle. The means for identifying one or more features in the map image data may include means for identifying one or more features in the plurality of images of the environment proximate the general location of the vehicle. The means for comparing one or more identified features of a first semantic classification with one or more features of the map image data of the first semantic classification may include means for comparing one or more identified features of the first semantic classification with one or more features of the first semantic classification in the plurality of images.

According to some embodiments, the means for registering a localized location of the vehicle within the environment based, at least in part, on the one or more identified features of the first semantic classification corresponding to the one or more features of the map image data of the first semantic classification may include: means for identifying an image of the plurality of images in which the one or more identified features of the first semantic classification correspond with one or more features of the first semantic classification of the identified image; means for retrieving a location associated with the identified image; and means for identifying the location associated with the identified image as the localized location. In response to registering a localized location of the vehicle within the environment, the apparatus may include: means for identifying at least one restriction associated with the road segment of the localized location; and means for providing for at least partial autonomous control of the vehicle according to the at least one restriction.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
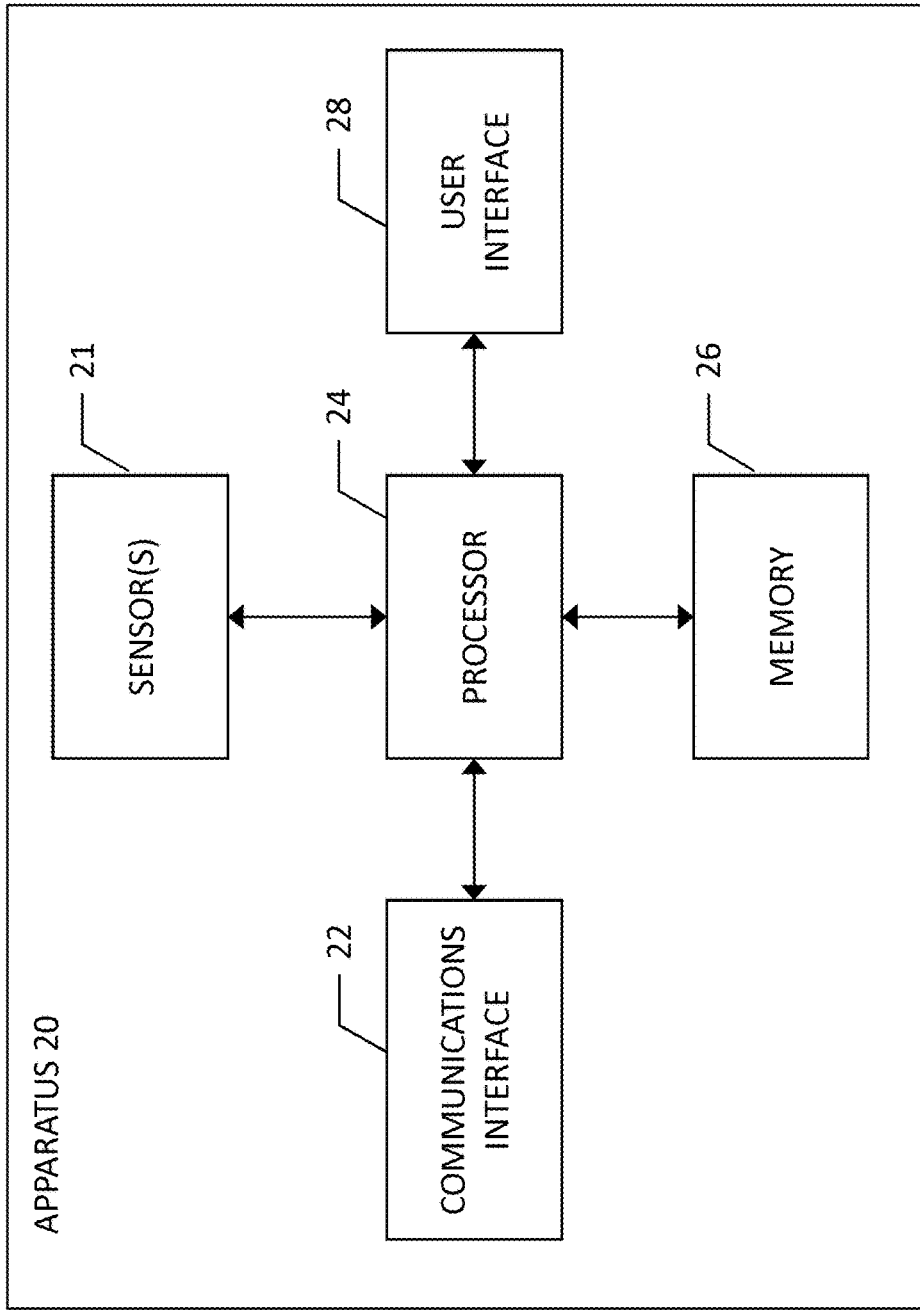
Figure 2:
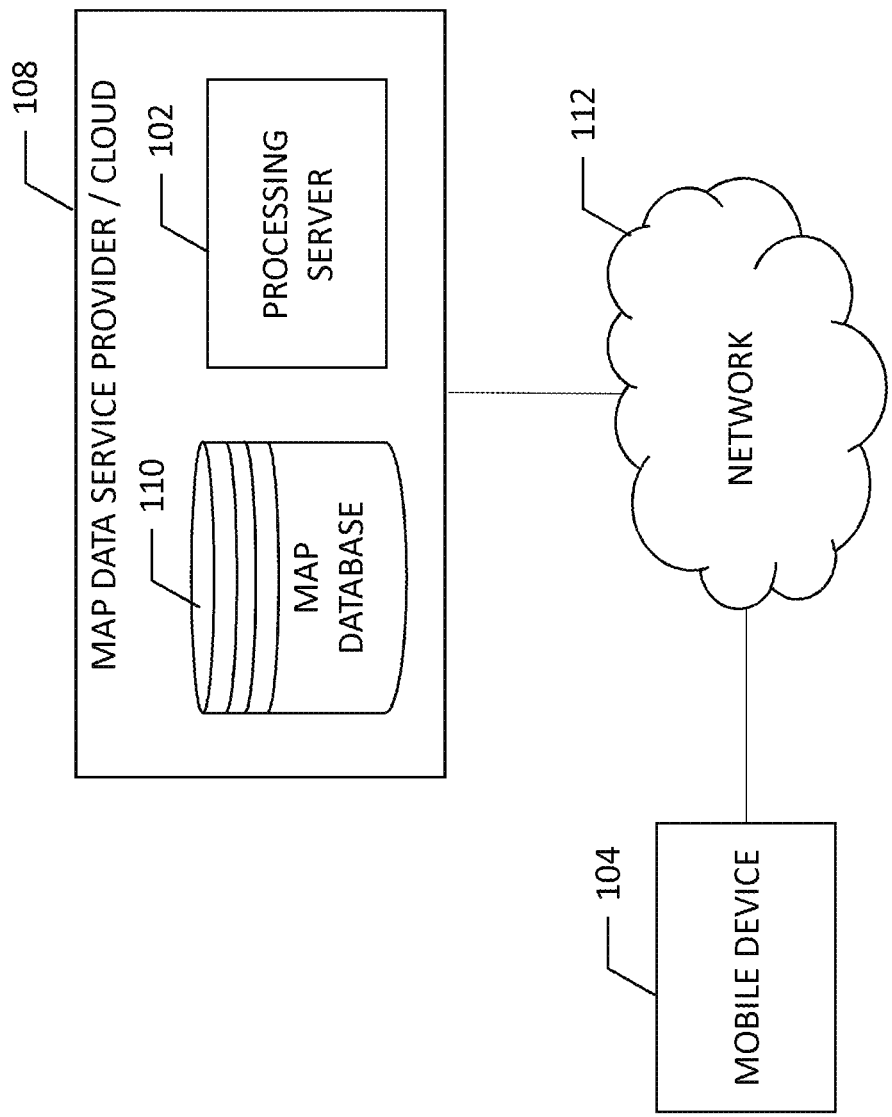
Figure 3:
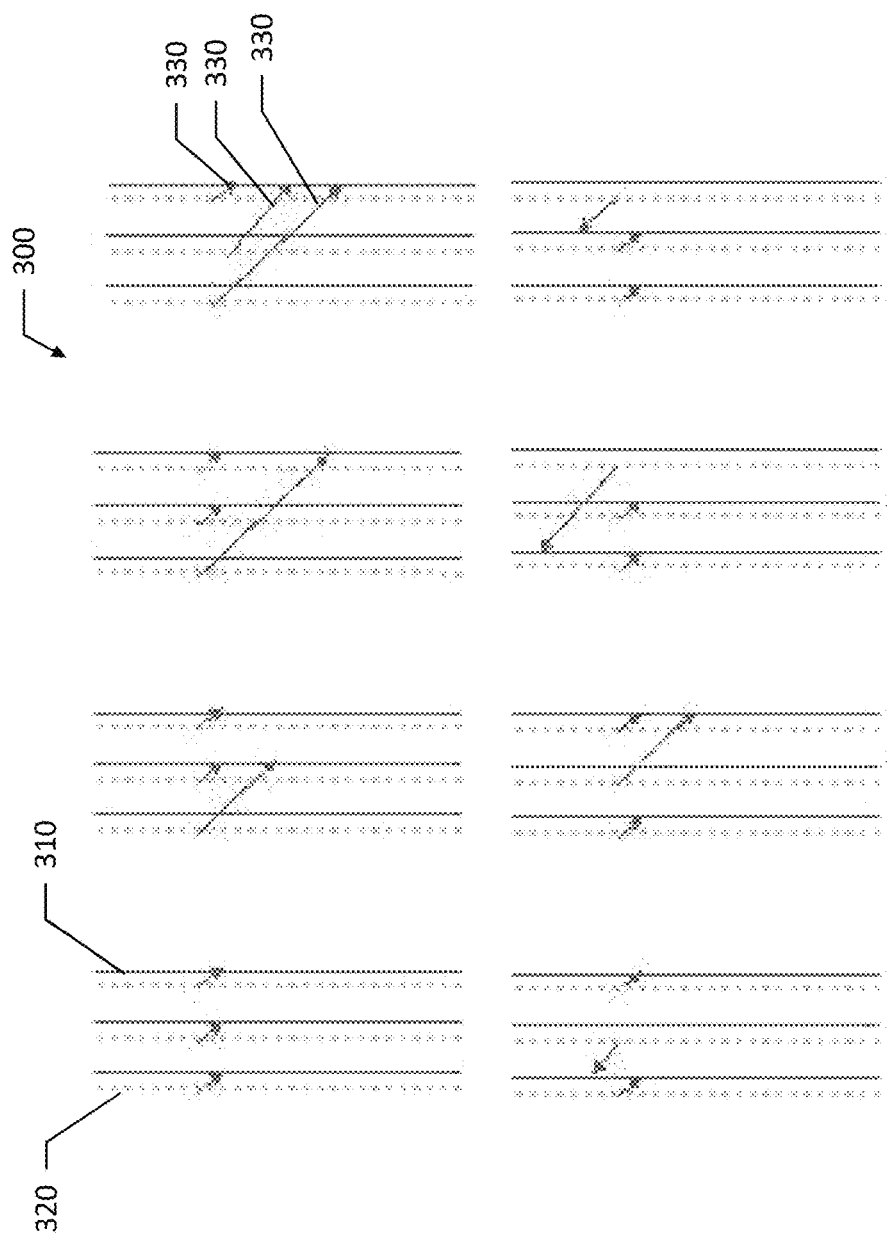
Figure 4:
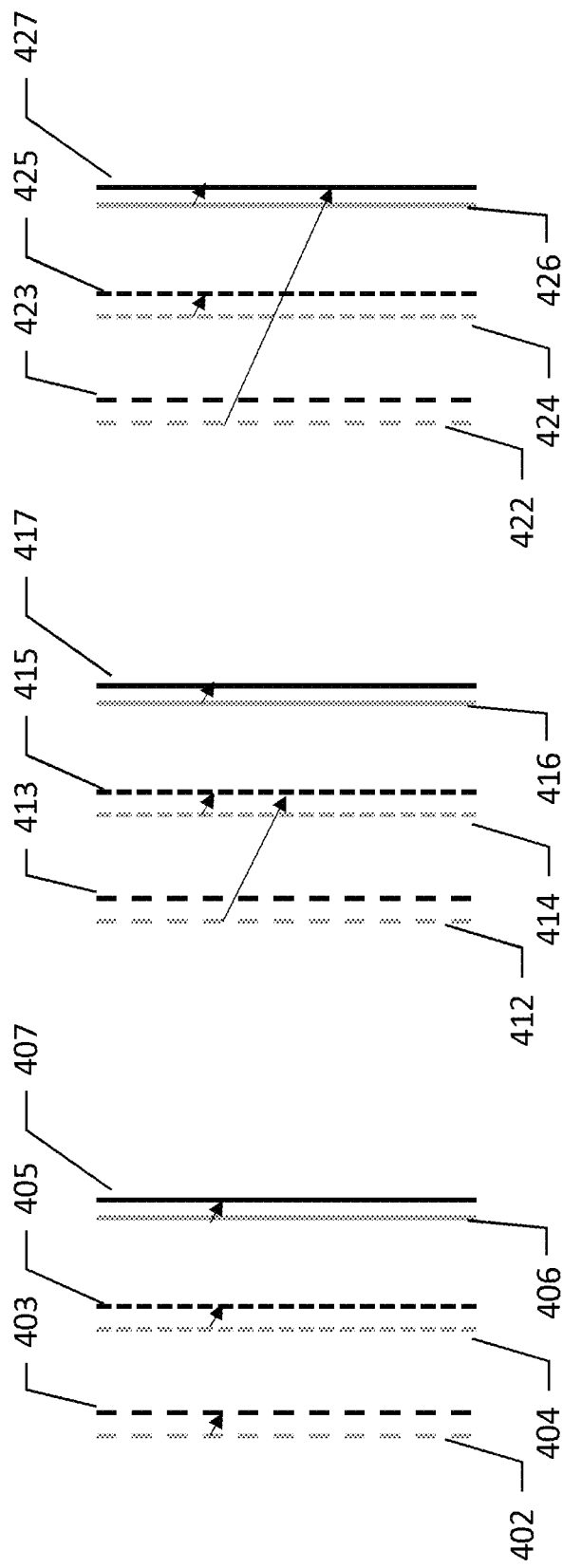
Figure 5:
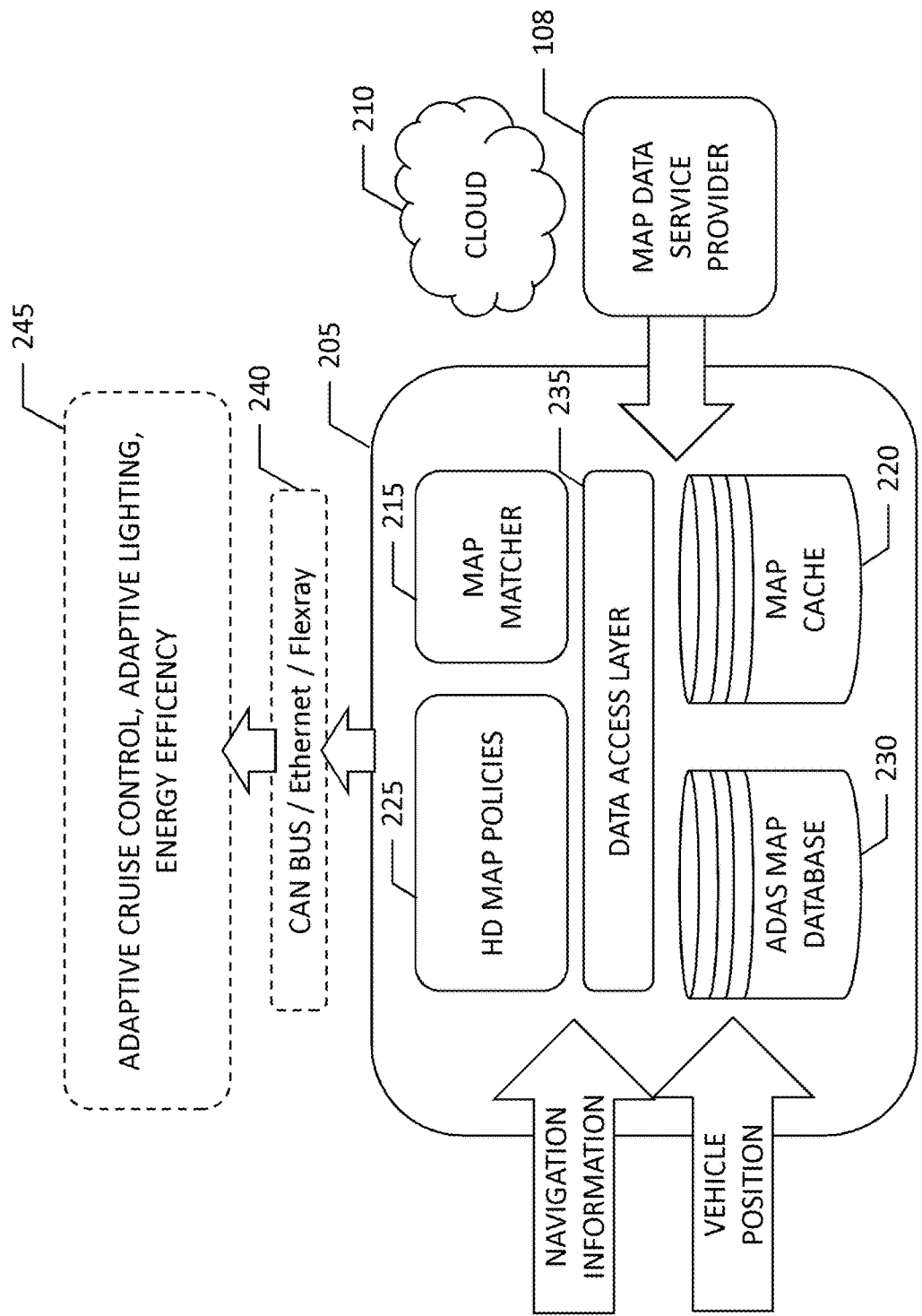
Figure 6:
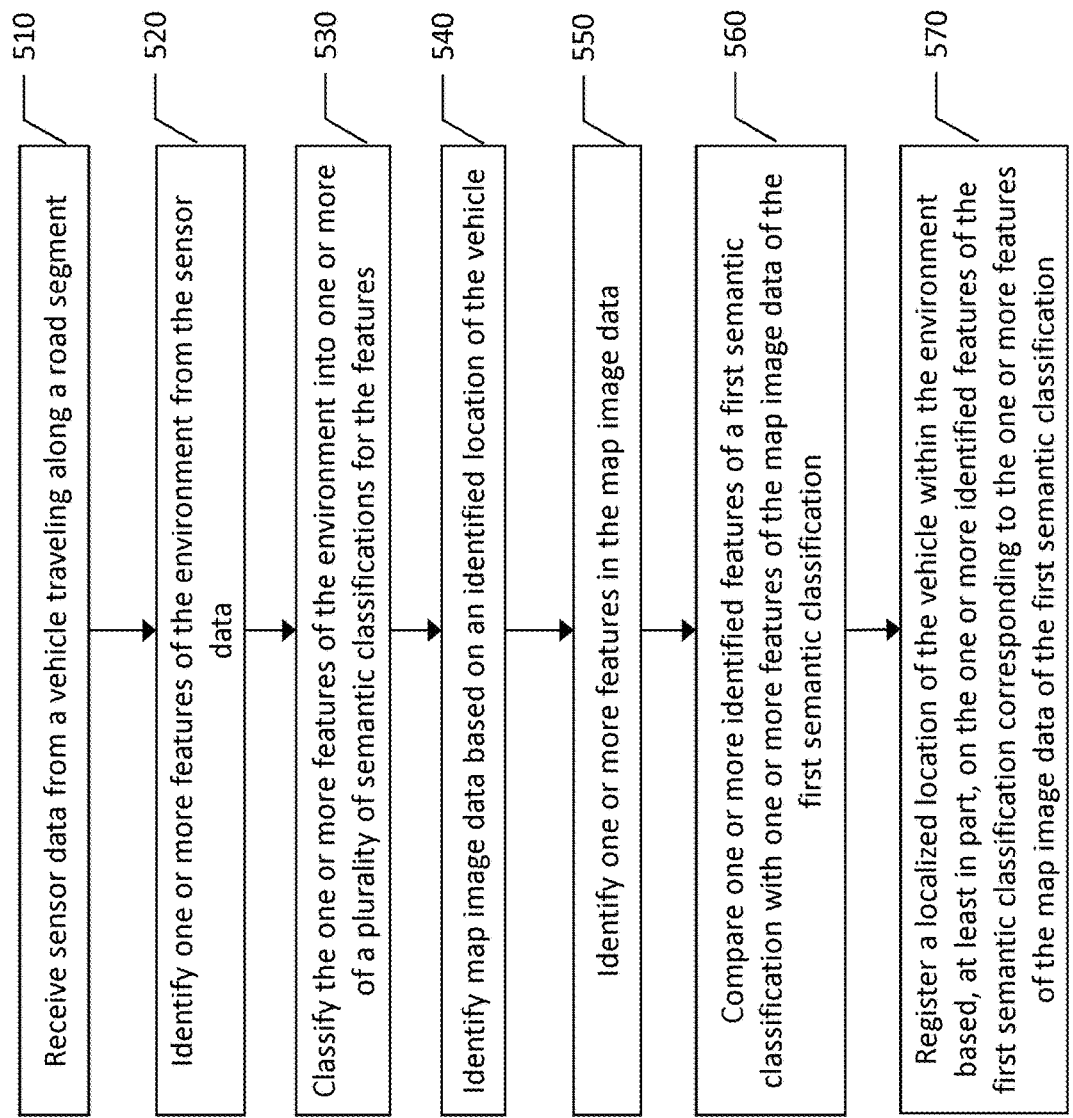

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for to improving the efficiency of localization according to an example embodiment of the present disclosure;

FIG. 3 illustrates a series of lane lines and the computational matching conventionally performed by localization;

FIG. 4 illustrates a series of lane lines and the more efficient matching performed by localization according to an example embodiment of the present disclosure;

FIG. 5 is a block diagram of a system for implementing the methods described herein for improving the efficiency of localization according to an example embodiment of the present disclosure; and FIG. 6 is a flowchart of operations for improving the efficiency of localization according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention for improving the efficiency of vision-based mapping. Embodiments relate to localization which may benefit autonomous and semi-autonomous vehicle control, in addition to navigational assistance and route guidance. Localization may include identifying an initial estimate of a vehicle location using a global positioning system (GPS) or other locating means (e.g., GLONASS, wireless signal fingerprinting, etc.), and refining that estimate using sensor data to establish a more accurate position of an apparatus, such as an autonomous vehicle, relative to a mapped region. Localization is tied closely to the sensor configuration of the apparatus and the feature-space of the map on which localization is performed. In order to localize an apparatus relative to a map, the GPS measurement may be used as an initial estimate, and subsequently refined by comparing features observed by the sensors to the features present in the map. Localization may be achieved when an area has a maximum overlap between mapped features and observed features, whereby a location is registered on a map.

The current context of human driving typically relies upon a combination of GPS-based routing and visual observations of road signs and road features to pilot a vehicle along road segments of a road network. A localizer, when deployed on-board a vehicle, or in some embodiments, performed remotely, may assist with positioning of the vehicle accurately at a lane-level accuracy, whereas GPS may be off by several meters and may be adversely affected by environmental factors. As such, GPS location alone may cause turns to be missed in dense environments when sufficient turn notice may not be possible. While GPS location information may be readily and quickly available in most cases, localization using sensor data compared against stored map data may be more time consuming and require more processing capacity. Embodiments described herein provide a method of improving the efficiency of localization to reduce latency and required processing capacity to render localization more readily accessible, which may promote the use of localization particularly in scenarios in which conventional localization has too much delay to be of use. For example, as a vehicle travels along a road segment, localization beyond GPS may be too slow or too computationally intensive for the localization to be effective. Embodiments described herein overcome this issue through making localization considerably more efficient and effective.

Embodiments described herein provide a technique whereby a human driver, and in some embodiments, an autonomous vehicle controller, may be assisted by a localizer as a navigation aid. When an environment lacks satellite-based locationing availability, such as the Global Positioning Satellite system, or when satellite-based locationing has low accuracy, a localization technique may be used to position the object relative to a map using only on-board sensor readings. Embodiments described herein may be of particular benefit to vehicle locationing, where identifying the location of a vehicle may be important or imperative. Vehicle navigation or autonomous or semi-autonomous vehicle control may rely on accurate identification of a location of a vehicle. As such, it may be important to determine the location of such a vehicle even when satellite based navigation means are not available or reliable. Vision-based mapping matches sensor data from the vehicle to an existing map in the form of geo-referenced images, which allows the vehicle to estimate its position relative to the map with a high degree of accuracy.

FIG. 1 is a schematic diagram of an example apparatus configured for performing some of the operations described herein, such as the gathering and processing of images that are geo-referenced for inclusion in a vision-based map database, or capturing of images or related sensor data to compare against a map database of geo-referenced images to identify the location of a vehicle. Apparatus 20 is an example embodiment that may be embodied by or associated with any of a variety of computing devices that include or are otherwise associated with a device configured for providing an advanced driver assistance features. For example, the computing device may be an Advanced Driver Assistance System module (ADAS) which may at least partially control autonomous or semi-autonomous features of a vehicle with the assistance of establishing the vehicle location using vision-based mapping system according to example embodiments described herein. However, embodiments of the apparatus may be embodied or partially embodied as a mobile terminal, such as a personal digital assistant (PDA), mobile telephone, smart phone, personal navigation device, tablet computer, camera or any combination of the aforementioned systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS) sensor/antenna, accelerometer, image sensor, LiDAR (Light Distancing and Ranging) sensor, radar, and/or gyroscopic sensor. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by near field communication, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may optionally support wired communication may alternatively support vehicle to vehicle or vehicle to infrastructure wireless links.

The apparatus 20 may support a mapping or navigation application so as to present maps or otherwise provide navigation, driver assistance, or some degree of autonomous control of a vehicle. For example, the apparatus 20 may provide for display of a map and/or instructions for following a route within a network of roads via user interface 28. In order to support a mapping application, the computing device may include or otherwise be in communication with a geographic database, which may be a map of a vision-based mapping system, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In an example embodiment of an apparatus for use in a vision-based mapping system, the map stored in memory 26 may include a databased of geo-referenced images used to identify the location of a vehicle through vision-based mapping techniques. In an example in which the apparatus is embodied by a vehicle, the memory 26 may store a portion of a vision-based map database including only portions of the database that are within a predetermined geographic region relative to the vehicle such that latency may be minimized when establishing a location through analysis of the geo-referenced images.

In example embodiments, a navigation system user interface, such as user interface 28, may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Having an accurate understanding of a location is critical to navigation assistance and autonomous or semi-autonomous vehicle control.

Autonomous vehicles or vehicles with some level of autonomous controls provide some degree of vehicle control that was previously performed by a person driving a vehicle. Removing some or all of the responsibilities of driving from a person and automating those responsibilities requires a high degree of confidence in performing those responsibilities in a manner at least as good as a human driver. Autonomous and semi-autonomous vehicle control may be performed in a variety of different ways. However, an understanding of the location of the vehicle is critical when using any form of map-based vehicle control. While some degree of autonomy can be provided through visual identification of objects along a road by a vehicle traveling along the road, such vision-based autonomous control strategies may benefit from or rely upon proper location identification of the vehicle among the road network. For example, accurately identifying the location of a vehicle along a road segment may enable identification of roadway restrictions, such as a speed limit, but also provide an understanding of the road geometry which may be stored in the map database, such as in a High Definition (HD) map database. In such embodiments, sensors on the vehicle may be used to establish dynamic obstacles and other vehicles on the road segment, while an understanding of the environment may rely upon accurate identification of the vehicle on a road segment.

Autonomous and semi-autonomous vehicles may use HD maps to help navigate and to control a vehicle along its path. These HD maps may provide road geometry, lane geometry, road segment restrictions (e.g., speed limits), lane restrictions (e.g., turn-only lanes), and any other information that may be related to the road segments of a road network. Further, HD maps may be dynamic and may receive updates periodically from map services providers which may be informed by vehicles traveling along the road segments with sensor packages able to identify and update the HD maps. Further, properties of road segments may change at different times of day or different days of the week, such as express lanes which may be in a first direction of travel at a first time of day, and a second direction of travel at a second time of day. HD maps may include this information to provide accurate navigation and to facilitate autonomy along these road segments to supplement a sensor package associated with a vehicle.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data, geo-referenced image data for vision-based locating, or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region. As noted above, sensor data from vehicles may be processed according to example embodiments described herein using a perception system to identify objects and features of a road segment. This data may be used to build and/or update the map database 110.

The map database 110 may be a master map database, such as an HD map database as described further below, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features and/or to facilitate autonomous or partial autonomous control of a vehicle. In such a case, the map database 110 can be downloaded or stored on the end user device which can access the map database 110 through a wireless or wired connection, such as via a processing server 102 and/or the network 112, for example. Such an embodiment may benefit vehicles using or relying on vision-based locating by storing or caching a portion of the database of geo-tagged images used for vision-based mapping on memory local to the vehicle in order to reduce or eliminate latency, which may be important during autonomous vehicle control that relies upon accurate location identification during operation.

As described above, the map database 110 of example embodiments may be generated from a plurality of different sources of data. Additional data may be stored in the map database such as traffic information, routing information, etc. This data may supplement the HD map data that provides an accurate depiction of a network of roads in the geographic region in a high level of detail including road geometries, features along the roads such as signs, rules related to travel along road segments such as speed limits, etc. The data stored in the map database may be gathered from multiple different sources, and one source of data that may help keep the data in the map database fresh is map data provided by vehicles traveling along the road segments of the road network.

While municipalities and businesses may provide map data to a map database, the ubiquity with which vehicles travel along road segments render those vehicles as opportunities to collect data related to the road segments provided the vehicles are equipped with some degree of sensor technology. A vehicle traveling along a road segment with only location sensing technology such as a Global Positioning System may provide data relating to the path of a road segment, while vehicles with more technologically advanced sensors may be able to provide additional information. Sensor data from image sensors or depth sensors such as LiDAR may provide details regarding the features of road segments including the position of signs along the road segment and the information contained on the signs. This data may be crowd sourced by map data service providers 108 to build more robust and reliable maps with a greater level of detail than previously available. Further, beyond building the maps in the map database 110, sensor data may be used to update map data or confirm existing map data to ensure the map database 110 is maintained and as up-to-date as possible.

Autonomous and semi-autonomous vehicles leverage sensor information relating to roads, objects, and features proximate the roads to determine safe regions of a road to drive and to evaluate their surroundings as they traverse a road segment. Further, autonomous and semi-autonomous vehicles may use high-definition map information to facilitate autonomous driving and to plan autonomous driving routes. These high-definition maps or HD maps may be specifically designed and configured to facilitate autonomous and semi-autonomous vehicle control and may be able to replicate road segments virtually with the inclusion of accurately placed signs and detailed information contained therein along with other features or objects proximate a roadway.

HD maps may have a high precision at resolutions that may be down to a several centimeters and may identify objects proximate a road segment, features of a road segment including lane widths, lane markings, traffic direction, road signs, speed limits, lane restrictions, etc. Autonomous and semi-autonomous vehicles may use these HD maps to facilitate the autonomous control features, such as traveling within a lane of a road segment at a prescribed speed limit, or following instructions of a road sign identified along a road segment. Autonomous vehicles may also be equipped with a plurality of sensors to facilitate autonomous vehicle control. Sensors may include image sensors/cameras, LiDAR, GPS, Inertial Measurement Units (IMUs), or the like which may measure the surroundings of a vehicle and communicate information regarding the surroundings to a vehicle control module to process and adapt vehicle control accordingly.

HD maps may be generated and updated based on sensor data from vehicles traveling along road segments of a road network. These vehicles may have various degrees of autonomy and may be equipped with a variety of different levels of sensors. Sensors from fully autonomous vehicles, for example, may be used to update map data or generate new map data in a form of crowd-sourced data from vehicles traveling along road segments. Sensor data received can be compared against other sensor data relating to the images captured by sensors to establish the accuracy of sensor data and to confirm the position, size, shape, etc. of features and objects along the road segment.

Embodiments described herein may broadly relate to using an on-board localizer (e.g., a vision-based localizer or localization framework) to assist a human driver and/or vehicle controller to navigate road conditions in real time. The HD maps described above have a high level of detail; however, the high level of detail is of limited value if a vehicle cannot be accurately located within the HD map as it travels along road segments within the map. Embodiments described herein provide a method of establishing a location of the vehicle in a more efficient manner using less processing capacity and reducing latency.

A visual map generated through embodiments described herein may provide a comprehensive database of the environment along each road segment of a network of roadways. The visual map may be part of or work in concert with HD maps as described above to facilitate navigational assistance, autonomous or semi-autonomous driving, and accurate location identification. Location identification, using a vision based localization as used in some embodiments described herein, may be implemented by correlating sensor readings of an image sensor or LiDAR sensor, for example, of a vehicle traveling along a road segment with the visual map generated as described herein. This method of location determination may facilitate navigation and various degrees of autonomous vehicle control.

The localization framework may compare observations from various sensors, such as sensors 21, of a vehicle to a map, which may be stored locally, such as on memory 26 or remotely at a map services provider and accessed via communications interface 22. The localization framework may establish the position of the vehicle with a high degree of accuracy and certainty. Sensor data may include features such as lane lines, signs, or other static objects positioned along a road segment that may be used to identify a location of the vehicle based on the sensor data. Sensor data may include a large volume of data gathered from one or more sensors representing the entirety of an environment of the vehicle. Similarly, a map database may include a plethora of data including images or models of an environment in which a vehicle is traveling. Performing a comparison between the sensor data and the map data may require substantial processing capacity due to the large volumes of data being compared. However, example embodiments described herein reduce the volume of data used for comparison through semantic-based pruning of data to substantially reduce the amount of data needed for comparison thus reducing the computational expense of the comparison and improving the efficiency.

For feature-sparse maps of an environment, with sparse being defined as a subset of observations used to build the map, the observations from the sensor space needs to be converted into the feature space as present on the map. To compare the sensor observations to the map at a certain location, a measurement function, including a score function or optimization objective, may be defined. The challenge with conventional visual localization lies in tuning the measurement function, in which typical approaches explore the entire comparison space between the mapped features and the measured features. Such an exhaustive, brute-force approach, while optimal in the context of full-coverage, is not conducive to real-time use. Embodiments described herein use semantic-based pruning to search the observation space in a substantially more efficient manner than conventional.

Localizer frameworks may use an iterative point cloud based approach, in which measurements from the sensors are iteratively compared to features on the map. The sum of perpendicular distances between the features in the sensor point cloud data and the features in the map data may be used as the objective function. Other variations include computing a correlation score between the sensor observations and the mapped features, with areas of high correlation corresponding to likely locations of the sensor(s). Other metrics may include computing the mutual information metric to maximize the overlap between observations and the map. The iterative point cloud based localizer, while stable, is computationally intensive. Since the entire search space needs to be exhaustively searched. The semantics-based pruning mechanism described herein reduces the search space speeding up the localization and the associated functions.

Embodiments described herein use a semantics-based prior to improve the speed of the search space coverage when comparing sensor observations from the environment to those in the map in order to localize the apparatus. The semantics-based pruning strategy may be used to direct the search space exploration, ensuring faster convergence than using brute-force strategies.

FIG. 3 illustrates the search space expansion 300 for a conventional vision based localizer, where a mapped section of a road having three previously identified lane lines is compared to a three lane set of observed lanes from a sensor. The illustrated embodiment is an example as the same methodology can be applied to any objects, such as signs, poles, static environmental objects, etc. The illustrated naïve search strategy explores all combinations possible with a three-by-three set of comparable lane lines, where eight iterations are illustrated as an example. As shown, three lane lines exist in the sensor data, where the sensor data is represented by solid lines 310, while the map data is represented by dashed lines 320. The line type is not indicative of the lane line type and is used only for distinction between map data and sensor data. As shown by the arrows 330, each sensor lane line 310 is compared against each map data lane line 320 when endeavoring to align the sensor data space with the map data space in order to maximize the overlap and produce a registered location of the sensor relative to the map.

However, the processing of data through a comparison of all features in one feature space (sensor data) against the features of another feature space (map data) results in a substantial amount of data processing requiring a substantial amount of processing capacity. According to example embodiments provided herein, semantic constraints are introduced with respect to the features such that a pruning strategy can be implemented that discards semantically dissimilar elements to avoid unnecessary feature comparisons between sensor data. This provides an exponential time savings and reduction in processing capacity such that localization can be performed much more efficiently and effectively.

HD maps as described herein may include semantic categories for features identified in the images of the map data representing environments of a road segment as a vehicle traverses the road segment. The stored map data may include semantic identifiers for the features of stored images and potentially for features in a model of the road network. These semantic categories for features may include different sign types (e.g., stop signs, speed limits, etc.) and/or different lane line types (e.g., dashed, short-dashed, solid, yellow, white, etc.) or other features that may commonly exist along a roadway. This semantic categorization allows detected features to only be correlated with map features of the same semantic category, thereby substantially reducing the amount of data that requires comparing. Features of an image may be categorized based on a number of factors. A perception module may be configured to categorize features detected in an image into the semantic categories. This categorization may be performed through machine learning, which may benefit from training data where features are either manually or automatically identified and categorized, and confirmed by a person to ensure the training data is accurate.

To generate map data including features categorized into semantic categories, sensor data for an environment may be gathered, whether by crowd-sourced sensor-equipped vehicles, or by vehicles employed by map data service providers. Once data is gathered, a perception module, which may be embodied by a processor such as processing server 102, may identify features within images of the environment. A user may be presented with the images and feature identification along with feature semantic categories. The user may confirm a predicted semantic category of a feature identified by the perception module, or the user may correct an improper semantic category. Once the image is labeled with features identified according to their semantic categories, the data may become training data to facilitate feature identification and categorization for future map image data.

FIG. 4 illustrates a series of three iterations of lane line comparison. According to the illustrated embodiment, the semantic categories may include lane line types including dashed lines (e.g., lane line 403), short-dashed lane lines (e.g., lane line 405), and solid lines (e.g., lane line 407) among other semantic categories. It is appreciated that while the example embodiments reference lane lines, embodiments described herein may equally apply to any feature categories that may be available, such as road signs, which may be categorized by shape, color, sign information (e.g., arrow type/direction, etc.). According to FIG. 4, lane lines are shown as sensed by a sensor of a vehicle (e.g., sensor 21 of apparatus 20) as even numbers (402, 404, 406, 412, 414, 416, 422, 424, 426) while map data is shown as lane lines 403, 405, 407, 413, 415, 417, 423, 425, 427. While conventional searches may perform all three comparisons shown in FIG. 4, due to the lane lines of the three lane lines being in different semantic categories, embodiments described herein would only perform the comparison of 402 to 403, 404 to 405, and 406 to 407. The search space is thus reduced from nine possibilities to a single possibility, saving nearly 90% of processing capacity and time. The semantic constraints may ensure that solid lines are compared only to solid lines, and not to any other category. This forces the search space to immediately discard regions where incorrect semantic categories are being compared, such as where a solid line is compared to a dashed line.

As described above, HD maps and the visual maps generated as described herein may be instrumental in facilitating manual or autonomous vehicle control. Building the HD maps and visual maps may rely on sensor data received from crowd sourced detectors including image sensors and depth detectors (e.g., LiDAR) from vehicles traveling along the network of roads that is mapped. The sensor data that is received is processed to identify objects and features in the sensor data to properly build and update the HD maps and visual maps, and to facilitate autonomous control of the vehicle generating the sensed data.

According to example embodiments described herein, the role of HD maps and visual maps in facilitating manual, autonomous, or semi-autonomous vehicle control may include crowd-sourced building of the maps to identify and confirm objects along with their respective locations. In the context of map-making, the features from the environment may be detected by a perception system of a map services provider or a vehicle traveling along a road segment and consolidated to form a representation of the actual real-world environment in the form of a map.

FIG. 5 illustrates an example embodiment of architecture specifically configured for implementing embodiments described herein. The illustrated embodiment of FIG. 5 may be vehicle-based, where sensor data is obtained from sensors of a vehicle traveling along a road segment. The location of the collected sensor data along the road segment may be determined through location determination using GPS or other locationing means, or using visual map correlation as described herein through correlation with map data of map data service provider 108. As illustrated, the architecture includes a map data service provider 108 that provides map data (e.g., visual maps and HD maps and policies associated with road links within the map) to the Advanced Driver Assistance System (ADAS) 205, which may be vehicle-based or server based depending upon application. The map data service provider may be a cloud-based 210 service. The ADAS receives navigation information and vehicle position and may use that information to map-match 215 the position to a road link on a map of the mapped network of roads stored in the map cache 220. This link or segment, along with the direction of travel, may be used to establish which HD map policies are applicable to the vehicle associated with the ADAS, including sensor capability information, autonomous functionality information, etc. Accordingly, policies for the vehicle are established based on the current location and the environmental conditions (e.g., traffic, time of day, weather). Further, signs along the road segment may be used to understand rules of operation along the road segment, and to identify changes to traffic flows which may be communicated via signs. The information from signs and their location along road segments may inform policies that govern how a vehicle is to traverse a road segment and these policies may be stored, for example, in an HD map of the region. The HD map policies associated with the road segment may be provided to the vehicle control, such as via the CAN (computer area network) BUS (or Ethernet or Flexray) 240 to the electronic control unit (ECU) 245 of the vehicle to implement HD map policies, such as various forms of autonomous or assisted driving, or navigation assistance.

A vehicle traveling along a road segment may receive sensor data from a plurality of sensors, such as sensors 21 of apparatus 20, used to capture data relating to the surrounding environment. A vehicle with autonomous or semi-autonomous control may detect features in the environment of the vehicle using a perception system, which may be embodied by processor 24, trained according to embodiments described herein to facilitate the autonomous or semi-autonomous control. Sensor redundancy may be used to provide additional confirmation relating to features and objects of the environment and to improve detection and reliability of vehicle interpretation of the surrounding environment. In order to implement full autonomy for a vehicle, the vehicle must be contextually aware in that the vehicle must be aware of the surroundings in terms of both dynamic conditions (e.g., weather, traffic, construction) and static conditions (e.g., road geometry, road signs). The vehicle context may be interpreted based on sensor observations that are passed through a perception module to understand the content of the observed environment. The perception module's set of detectors may correspond to deep-neural network based methods of understanding features in the environment and identifying a location of the features in the environment. These detected features may be categorized into semantic categories to expedite the comparison search between the sensor data and the map data as described above to more precisely locate the vehicle within the mapped environment in an efficient manner in real time.

FIG. 6 illustrates a flowchart depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 6 is a flowchart of a method for reducing the computational intensity of vision-based localization by reducing the amount of data and number of features that need to be compared with one another to register a location of a vehicle. According to the illustrated embodiment, sensor data is received from a vehicle traveling along a road segment at 510. This sensor data may be image sensor data or LiDAR data of an environment of the vehicle as it travels along a road segment, where the sensors may be embodied by sensors 21 of apparatus 20 of FIG. 1. One or more features of the environment may be identified from the sensor data at 520. Features may be identified by a perception module, which may be embodied by processor 24 and may be located locally within the vehicle, or remotely such as at a map data service provider 108. The one or more features of the environment may be classified at 530 into one or more of a plurality of semantic classifications for the features. This process may also be carried out by a perception module, which may be informed through machine learning and training data as described above.

As shown at 540, map image data may be identified based on an identified location of a vehicle. The identified location may be established through a locationing means such as GPS, where the identified location may be accurate, but not sufficiently precise for reliance in autonomous vehicle control or navigation using HD maps. One or more features in the map image data may be identified at 550. These features may be identified based on an indication from the map data service provider 108 which may provide image data from the environment proximate the vehicle including an identification of features and their corresponding semantic classifications. At 560, a comparison is made between one or more identified features of a first semantic classification with one or more features of the map image data of the first semantic classification. This comparison, which may be performed by processor 24, compares sensed data against map data to identify and correlate features of a common semantic classification. This method avoids comparing features of different semantic classifications such that the required processing capacity is reduced substantially, such as by as much as 90% or more. At 570, a localized location of the vehicle within the environment is registered based, at least in part, on the one or more identified features of the first semantic classification corresponding to the one or more features of the map image data of the first semantic classification.

In an example embodiment, an apparatus for performing the method of FIG. 6 above may comprise a processor (e.g., the processor 24) configured to perform some or each of the operations (510-570) described above. The processor may, for example, be configured to perform the operations (510-570) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-570 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the trainings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   receive sensor data from a vehicle traveling along a road segment, wherein the sensor data comprises image data from an environment of the vehicle;
   identify one or more features of the environment from the sensor data;
   classify the one or more identified features into one or more of a plurality of semantic classifications for the features;
   identify map image data based on an identified location of the vehicle;
   identify one or more features in the map image data;
   compare one or more identified features of a first semantic classification with one or more features of the map image data of the first semantic classification; and
   register a localized location of the vehicle within the environment based, at least in part, on the one or more identified features of the first semantic classification corresponding to the one or more features of the map image data of the first semantic classification, wherein the localized location of the vehicle is more accurate than the identified location of the vehicle.

2. The apparatus of claim 1, wherein the plurality of semantic classifications include one or more of lane line type, lane line color, road sign type, or road sign color.

3. The apparatus of claim 1, wherein causing the apparatus to identify the map image data based on an identified location of the vehicle comprises causing the apparatus to identify a plurality of images of an environment proximate a general location of the vehicle; and
   wherein causing the apparatus to identify one or more features in the map image data comprises causing the apparatus to identify one or more features in the plurality of images of the environment proximate the general location of the vehicle.

4. The apparatus of claim 3, wherein causing the apparatus to compare one or more identified features of a first semantic classification with one or more features of the map image data of the first semantic classification comprises causing the apparatus to:
   compare one or more identified features of the first semantic classification with one or more features of the first semantic classification in the plurality of images.

5. The apparatus of claim 4, wherein causing the apparatus to register a localized location of the vehicle within the environment based, at least in part, on the one or more identified features of the first semantic classification corresponding to the one or more features of the map image data of the first semantic classification comprises causing the apparatus to:
   identify an image of the plurality of images in which the one or more identified features of the first semantic classification correspond with one or more features of the first semantic classification of the identified image;
   retrieve a location associated with the identified image; and
   identify the location associated with the identified image as the localized location.

6. The apparatus of claim 1, wherein in response to registering the localized location of the vehicle within the environment, the apparatus is further caused to:
   identify at least one restriction associated with the road segment of the localized location; and
   provide for at least partial autonomous control of the vehicle according to the at least one restriction.

7. The apparatus of claim 1, wherein in response to registering the localized location of the vehicle within the environment, the apparatus is further caused to:
   identify at least one restriction associated with the road segment of the localized location; and
   provide an indication to a driver of the vehicle of the at least one restriction.

8. A computer program product having at least one non-transitory computer-readable storage medium with computer-executable program code instructions stored therein, the computer-executable program code instructions comprising program code instructions to:
- receive sensor data from a vehicle traveling along a road segment, wherein the sensor data comprises image data from an environment of the vehicle;
- identify one or more features of the environment from the sensor data;
- classify the one or more identified features into one or more of a plurality of semantic classifications for the features;
- identify map image data based on an identified location of the vehicle;
- identify one or more features in the map image data;
- compare one or more identified features of a first semantic classification with one or more features of the map image data of the first semantic classification; and
- register a localized location of the vehicle within the environment based, at least in part, on the one or more identified features of the first semantic classification corresponding to the one or more features of the map image data of the first semantic classification, wherein the localized location of the vehicle is more accurate than the identified location of the vehicle.

9. The computer program product of claim 8, wherein the plurality of semantic classifications include one or more of lane line type, lane line color, road sign type, or road sign color.

10. The computer program product of claim 8, wherein the program code instructions to identify the map image data based on an identified location of the vehicle comprises program code instructions to identify a plurality of images of an environment proximate a general location of the vehicle; and
- wherein the program code instructions to identify one or more features in the map image data comprises program code instructions to identify one or more features in the plurality of images of the environment proximate the general location of the vehicle.

11. The computer program product of claim 10, wherein the program code instructions to compare one or more identified features of a first semantic classification with one or more features of the map image data of the first semantic classification comprises program code instructions to:
- compare one or more identified features of the first semantic classification with one or more features of the first semantic classification in the plurality of images.

12. The computer program product of claim 11, wherein the program code instructions to register a localized location of the vehicle within the environment based, at least in part, on the one or more identified features of the first semantic classification corresponding to the one or more features of the map image data of the first semantic classification comprises program code instructions to:
- identify an image of the plurality of images in which the one or more identified features of the first semantic classification correspond with one or more features of the first semantic classification of the identified image;
- retrieve a location associated with the identified image; and
- identify the location associated with the identified image as the localized location.

13. The computer program product of claim 8, wherein in response to registering the localized location of the vehicle within the environment, the computer program product further includes program code instructions to:
- identify at least one restriction associated with the road segment of the localized location; and
- provide for at least partial autonomous control of the vehicle according to the at least one restriction.

14. The computer program product of claim 8, wherein in response to registering the localized location of the vehicle within the environment, the computer program product further includes program code instructions to:
- identify at least one restriction associated with the road segment of the localized location; and
- provide an indication to a driver of the vehicle of the at least one restriction.

15. A method comprising:
- receiving sensor data from a vehicle traveling along a road segment, wherein the sensor data comprises image data from an environment of the vehicle;
- identifying one or more features of the environment from the sensor data;
- classifying the one or more identified features into one or more of a plurality of semantic classifications for the features;
- identifying map image data based on an identified location of the vehicle;
- identifying one or more features in the map image data;
- comparing one or more identified features of a first semantic classification with one or more features of the map image data of the first semantic classification; and
- registering a localized location of the vehicle within the environment based, at least in part, on the one or more identified features of the first semantic classification corresponding to the one or more features of the map image data of the first semantic classification, wherein the localized location of the vehicle is more accurate than the identified location of the vehicle.

16. The method of claim 15, wherein the plurality of semantic classifications include one or more of lane line type, lane line color, road sign type, or road sign color.

17. The method of claim 15, wherein identifying the map image data based on an identified location of the vehicle comprises identifying a plurality of images of an environment proximate a general location of the vehicle; and
- wherein identifying one or more features in the map image data comprises identifying one or more features in the plurality of images of the environment proximate the general location of the vehicle.

18. The method of claim 17, wherein comparing one or more identified features of a first semantic classification with one or more features of the map image data of the first semantic classification comprises:
- comparing one or more identified features of the first semantic classification with one or more features of the first semantic classification in the plurality of images.

19. The method of claim 18, wherein registering a localized location of the vehicle within the environment based, at least in part, on the one or more identified features of the first semantic classification corresponding to the one or more features of the map image data of the first semantic classification comprises:
- identifying an image of the plurality of images in which the one or more identified features of the first semantic classification correspond with one or more features of the first semantic classification of the identified image;
- retrieving a location associated with the identified image; and identifying the location associated with the identified image as the localized location.

20. The method of claim 15, wherein in response to registering the localized location of the vehicle within the environment, the method comprises:
  identifying at least one restriction associated with the road segment of the localized location; and
  providing for at least partial autonomous control of the vehicle according to the at least one restriction.

* * * * *